(12) United States Patent
Cook et al.

(10) Patent No.: US 10,568,259 B2
(45) Date of Patent: Feb. 25, 2020

(54) CENTER LINK KNIFE DRIVE FOR A HEADER OF AN AGRICULTURAL HARVESTER

(71) Applicant: CNH Industrial America LLC, New Holland, PA (US)

(72) Inventors: Joel Cook, Lititz, PA (US); John Hinkle, York Springs, PA (US); Herb Farley, Elizabethtown, PA (US); David M. DeChristopher, Ephrata, PA (US); Barry Lehman, York, PA (US)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 15/865,834

(22) Filed: Jan. 9, 2018

(65) Prior Publication Data

US 2019/0208702 A1 Jul. 11, 2019

(51) Int. Cl.
*A01D 34/34* (2006.01)
*A01D 34/14* (2006.01)
*A01D 41/14* (2006.01)

(52) U.S. Cl.
CPC .......... *A01D 34/34* (2013.01); *A01D 34/145* (2013.01); *A01D 41/142* (2013.01)

(58) Field of Classification Search
CPC ...... A01D 34/30; A01D 34/145; A01D 34/02; A01D 34/14; A01D 34/305; A01D 41/14; A01D 41/142; A01D 34/135; A01D 34/32; A01D 34/13; A01D 34/34
See application file for complete search history.

(56) References Cited

U.S. PATENT DOCUMENTS

| | | | |
|---|---|---|---|
| 536,924 A | 4/1895 | Dorney | |
| 1,424,617 A | 8/1922 | Campbell et al. | |
| 1,647,867 A * | 11/1927 | Hutsell | A01D 34/02 33/1 A |
| 2,823,506 A | 2/1958 | Irving | |
| 3,941,003 A | 3/1976 | Garrison et al. | |

(Continued)

FOREIGN PATENT DOCUMENTS

| | | |
|---|---|---|
| DE | 29719762 U1 | 2/1998 |
| DE | 102015106087 A1 | 10/2016 |

(Continued)

OTHER PUBLICATIONS

Extended European Search Report for EP Application No. 19150777.1 dated May 14, 2019 (13 pages).

*Primary Examiner* — Arpad Fabian-Kovacs
(74) *Attorney, Agent, or Firm* — Peter K. Zacharias; Patrick M. Sheldrake (57) ABSTRACT

A knife head drive assembly for a header of an agricultural harvester including a knife head assembly for attachment to a forward end of the header. A first pivot arm and a second pivot arm are carried by the knife head assembly and are pivotably connected by a linkage. A rotating crank is operatively connected to and extending substantially transverse to the knife head assembly for engagement with a drive. A reciprocating shaft is connected to the rotating crank and either of the pivot arms or the linkage. Operation of the knife head drive assembly results in substantially linear, opposed oscillating motion of cutter bars carried by the knife head assembly.

21 Claims, 11 Drawing Sheets

(56) References Cited

U.S. PATENT DOCUMENTS

| | | | |
|---|---|---|---|
| 4,067,179 A * | 1/1978 | Schneider | A01D 34/30 |
| | | | 56/297 |
| 4,198,803 A | 4/1980 | Quick et al. | |
| 4,891,932 A | 1/1990 | Johnson | |
| 4,901,512 A * | 2/1990 | Castoldi | A01D 34/13 |
| | | | 56/293 |
| 4,909,025 A * | 3/1990 | Reissig | A01D 34/305 |
| | | | 56/257 |
| 5,497,605 A * | 3/1996 | Underwood | A01D 34/30 |
| | | | 56/14.6 |
| 7,730,709 B2 | 6/2010 | Priepke | |
| 7,845,253 B2 | 12/2010 | Gil et al. | |
| 8,151,547 B2 | 4/2012 | Bich et al. | |
| 8,347,594 B1 | 1/2013 | Lovett et al. | |
| 8,973,345 B2 | 3/2015 | Brimeyer et al. | |
| 9,622,409 B2 * | 4/2017 | Coers | A01D 41/14 |
| 2011/0099964 A1 * | 5/2011 | Coers | A01D 41/14 |
| | | | 56/296 |
| 2013/0160417 A1 | 6/2013 | Huseman et al. | |
| 2014/0215991 A1 * | 8/2014 | Brimeyer | A01D 34/30 |
| | | | 56/14.7 |
| 2014/0318094 A1 * | 10/2014 | Cook | A01D 34/30 |
| | | | 56/10.1 |
| 2014/0345239 A1 * | 11/2014 | Cook | A01D 34/145 |
| | | | 56/10.1 |
| 2015/0000237 A1 * | 1/2015 | Ritter | A01D 34/02 |
| | | | 56/10.1 |
| 2015/0163994 A1 * | 6/2015 | Bich | A01D 34/14 |
| | | | 56/299 |
| 2015/0305233 A1 * | 10/2015 | Surmann | A01D 34/135 |
| | | | 56/10.1 |
| 2016/0174460 A1 | 6/2016 | Honey et al. | |
| 2017/0086368 A1 * | 3/2017 | Cook | A01D 34/30 |
| 2018/0139897 A1 * | 5/2018 | Bueermann | A01D 34/135 |
| 2019/0090422 A1 * | 3/2019 | Deevy | A01D 41/1274 |
| 2019/0124830 A1 * | 5/2019 | DeChristopher | A01D 34/42 |
| 2019/0124832 A1 * | 5/2019 | DeChristopher | A01D 34/30 |

FOREIGN PATENT DOCUMENTS

| | | | | |
|---|---|---|---|---|
| EP | | 2769610 | 8/2014 | |
| JP | | 2897278 B2 | 5/1999 | |
| WO | WO-2014023408 A2 * | 2/2014 | | A01D 41/142 |

* cited by examiner

CENTER LINK KNIFE DRIVE FOR A HEADER OF AN AGRICULTURAL HARVESTER

The exemplary embodiments of present invention relate generally to a knife head drive assembly for a header of an agricultural harvester and, more specifically, to a knife head assembly having an exposed center link knife drive for driving crop cutterbars.

BACKGROUND OF THE DISCLOSURE

An agricultural harvester e.g., a plant cutting machine, including, but not limited to, a powered vehicle such as a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via at least one conveyor such as a draper belt and/or an infeed belt towards a feederhouse located centrally inside the header.

Cutterbar knife drives oscillate first and second sickle mechanisms of cutterbars in opposite directions in order to cut crop. However, existing center knife drives often include a complicated gearbox with two shafts extending upward that oscillate back and forth and drive the two knives on the header. The two shafts protrude up from a relatively flat gearbox cover and have seals to keep oil in the gearbox and dirt out. These seals have proven to be difficult to keep working properly in certain conditions due to dirt accumulation. Once dirt gets past the seals and into the gearbox, bearings and other components become worn and result in failures that are costly and time-consuming to remedy. In addition, the complicated gearbox is relatively difficult to modify or to retrofit for different applications due to its design and manufacturing method.

BRIEF SUMMARY OF THE DISCLOSURE

In accordance with an exemplary embodiment there is provided a header for an agricultural harvester comprising a chassis and a conveyor supported by the chassis. A drive is supported by the chassis and positioned adjacent a lateral side of the conveyor. A rotating crank is operatively connected to the drive. The header further comprises a knife head assembly about a forward end of the conveyor and spaced from the drive and a reciprocating shaft connected to the rotating crank and the knife head assembly.

An aspect of the exemplary embodiment is that the knife head assembly comprises a first pivot arm connected to the reciprocating shaft.

An aspect of the exemplary embodiment is that the knife head assembly further comprises a second pivot arm carried by the knife head assembly and connected to the first pivot arm, wherein pivoting of the first pivot arm by the reciprocating shaft in a first direction causes the second pivot arm to pivot in a second direction opposite the first direction, and wherein pivoting of the first pivot arm by the reciprocating shaft in the second direction causes the linkage to pivot the second pivot arm in the first direction.

Another aspect of the exemplary embodiment is that a drive shaft driven by the drive is connected to an oscillating drive mechanism including the rotating crank.

Another aspect of the exemplary embodiment is that the oscillating drive mechanism includes a gear set connecting the drive shaft to a gear operably connected the rotating crank, wherein the rotating crank includes an eccentrically arranged pin operatively connected to a second end of the reciprocating shaft for driving the reciprocating shaft in an oscillating motion.

Another aspect of the exemplary embodiment is that a bracket is secured to the chassis, wherein the first and second pivot arms are pivotably connected to the bracket. In addition, a linkage has a first end pivotably connected to the first pivot arm and a second end pivotably connected to the second pivot arm.

Another aspect of the exemplary embodiment is that the first pivot arm has a first end, an intermediate portion pivotably connected to the bracket and a second end connected to a first cutterbar knife head. The second pivot arm has a first end, an intermediate portion pivotably connected to the bracket and a second end connected to a second cutterbar knife head. A first end of the reciprocating shaft is pivotably connected to the first pivot arm, the second pivot arm or the linkage.

Another aspect of the exemplary embodiment and all other exemplary embodiments described herein is that at least one open grate skid shoe is positioned beneath the knife head assembly.

Another aspect of the exemplary embodiment and all other exemplary embodiments described herein is that at least one hinged skid shoe is positioned beneath the knife head assembly. The skid shoe has a forward end and a rearward end, wherein the forward end of the skid shoe is pivotably connected to the chassis.

In accordance with a second exemplary embodiment there is provided a knife head drive assembly for a header of an agricultural harvester comprising a knife head assembly for attachment to a forward end of the header. A first pivot arm is carried by the knife head assembly and a rotating crank is operatively connected to and extending substantially transverse to the first pivot arm for engagement with a drive.

An aspect of the second exemplary embodiment is that a reciprocating shaft has a first end connected to a first end of the first pivot arm and a second end connected to the rotating crank.

Another aspect of the second exemplary embodiment is that a second pivot arm is carried by the knife head assembly and a linkage pivotably connects the first pivot arm and the second pivot arm, wherein pivoting of the first pivot arm by the reciprocating shaft in a first direction causes the linkage to pivot the second pivot arm in a second direction opposite the first direction, and wherein pivoting of the first pivot arm by the reciprocating shaft in the second direction causes the linkage to pivot the second pivot arm in the first direction.

Another aspect of the second exemplary embodiment is that the first pivot arm has a first end pivotably connected to the first end of the reciprocating shaft, an intermediate portion pivotably connected to a bracket, and a second end connected to a first cutterbar knife head. The second pivot arm has a first end, an intermediate portion pivotably connected to the bracket, and a second end connected to a second cutterbar knife head. A first end of the linkage is pivotably connected to the first pivot arm between the intermediate portion and the second end of the first pivot arm, and a second end of the linkage is pivotably connected to the second pivot arm between the intermediate portion and the first end of the second pivot arm.

Another aspect of the second exemplary embodiment is that the linkage comprises a central link having a first end, an intermediate portion pivotably connected to the header, and a second end. The linkage further comprises a first lateral link having a first end pivotably connected to a first end of the first pivot arm and a second end pivotably connected to the first end of the central link, and a second lateral link having a first end pivotably connected to a first end of the second pivot arm and a second end pivotably connected to the second end of the central link. In addition, a reciprocating shaft is connected to the rotating crank and the central link.

Another aspect of the second exemplary embodiment and all other exemplary embodiments described herein is that the knife head drive assembly is exposed or unhoused, i.e., not enclosed in a housing or completely shielded.

In accordance with a third exemplary embodiment there is provided an agricultural harvester comprising a powered vehicle and a header attachable to the powered vehicle. The header includes a chassis, a conveyor supported by the chassis, a drive adjacent a lateral side of the conveyor, and a rotating crank operatively connected to the drive. The agricultural harvester further comprises a knife head drive assembly including a knife head assembly attachable to a forward end of the header, a first pivot arm carried by the knife head assembly, and a rotating crank operatively connected to and extending substantially transverse to the pivot arm for engagement with the drive.

An aspect of the third exemplary embodiment is that a reciprocating shaft has a first end connected to a first end of the first pivot arm and a second end connected to the rotating crank.

Another aspect of the third exemplary embodiment is that a second pivot arm is carried by the knife head assembly and a linkage pivotably connects the first pivot arm and the second pivot arm. Pivoting of the first pivot arm by the reciprocating shaft in a first direction causes the linkage to pivot the second pivot arm in a second direction opposite the first direction, and wherein pivoting of the first pivot arm by the reciprocating shaft in the second direction causes the linkage to pivot the second pivot arm in the first direction.

Another aspect of the third exemplary embodiment is that a drive shaft connects the drive to the rotating crank, wherein the drive shaft is arranged generally transverse to the reciprocating shaft.

In accordance with the exemplary embodiments, there is provided an exposed knife head drive assembly for a header of an agricultural harvester. When the subject disclosure is used in combination with an agricultural harvester, the disclosure overcomes one more of the disadvantages referenced above by providing a header in which the exposed or unhoused knife head drive assembly eliminates the need for an enclosed and sealed gearbox wherein the seals have proven to be difficult to keep working properly in certain conditions due to dirt accumulation. The exposed knife head drive assembly is easy to repair and comparatively easy to modify or retrofit for different applications.

The subject disclosure also addresses the challenges of crop conveyance from the knife drive to the infeed conveyor belt. That is, in accordance with the exemplary embodiments, the knife head drive assembly is compact in the fore-to-aft direction thereby enabling the infeed conveyor to be moved further forward relative to conventional header constructions.

Further in accordance with the exemplary embodiments, the subject disclosure provides a construction that reduces and preferably eliminates any possibility for dirt to build up and rest on the top of the seals (where seals are necessary such as at the pivot joints). This would mainly be accomplished by using rounded surfaces and avoiding the flat cover associated with the existing gearboxes. In addition, the seals would be mounted higher than any areas around them to avoid material buildup on the seals. In addition, joints used could include ball joints similar to those used on certain existing knifeheads as well as rubber bushings.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
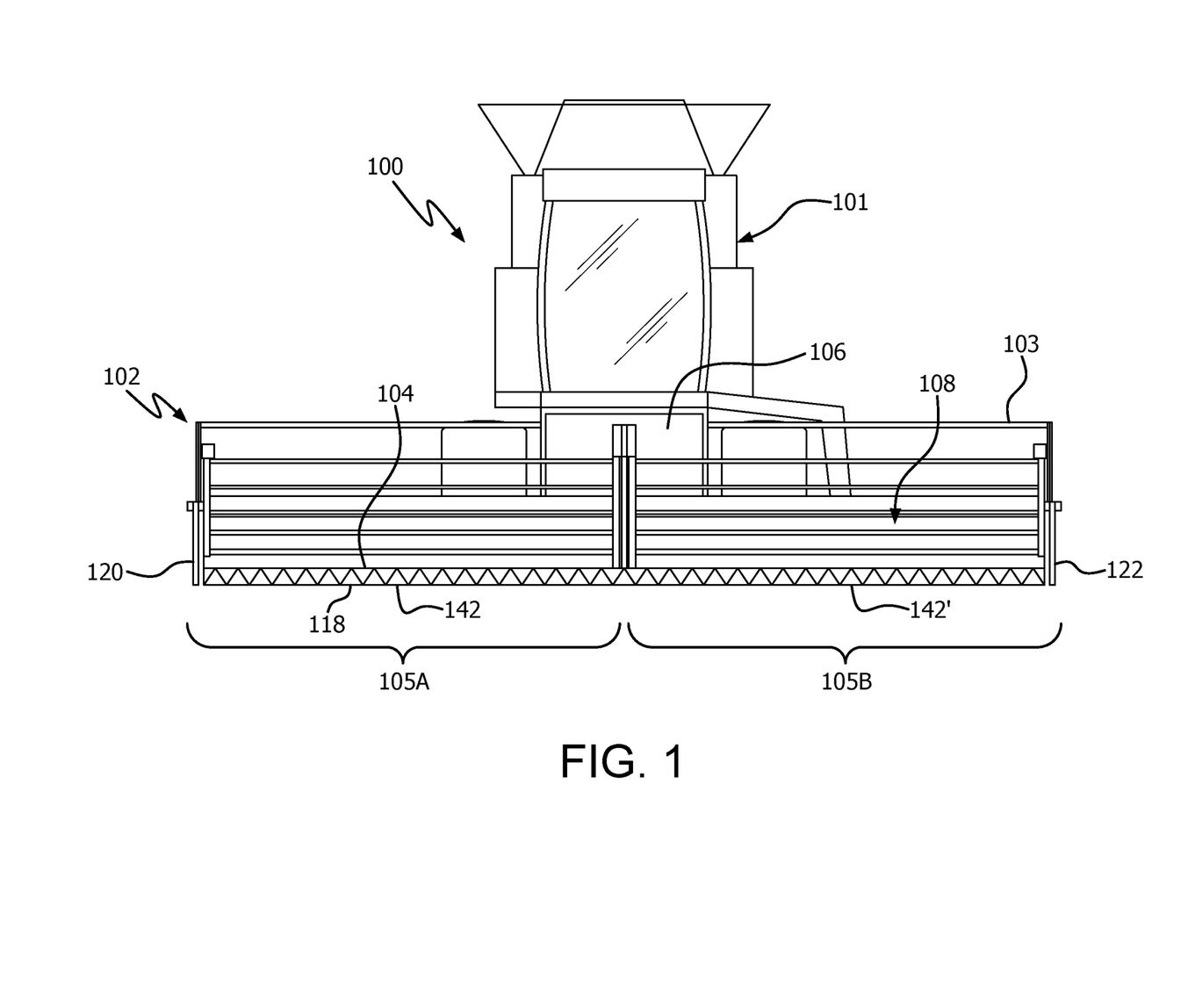
FIG. 1 is a front elevation view of an agricultural harvester including a header in accordance with an exemplary embodiment of the subject disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 comprises a powered vehicle 101 and includes a header 102 attached to a forward end of the harvester, which is configured to cut crops, including (without limitation) small grains (e.g., wheat, soybeans, grain, etc.), and to induct the cut crops into a feederhouse 106 as the harvester moves forward over a crop field.

Figure 2:
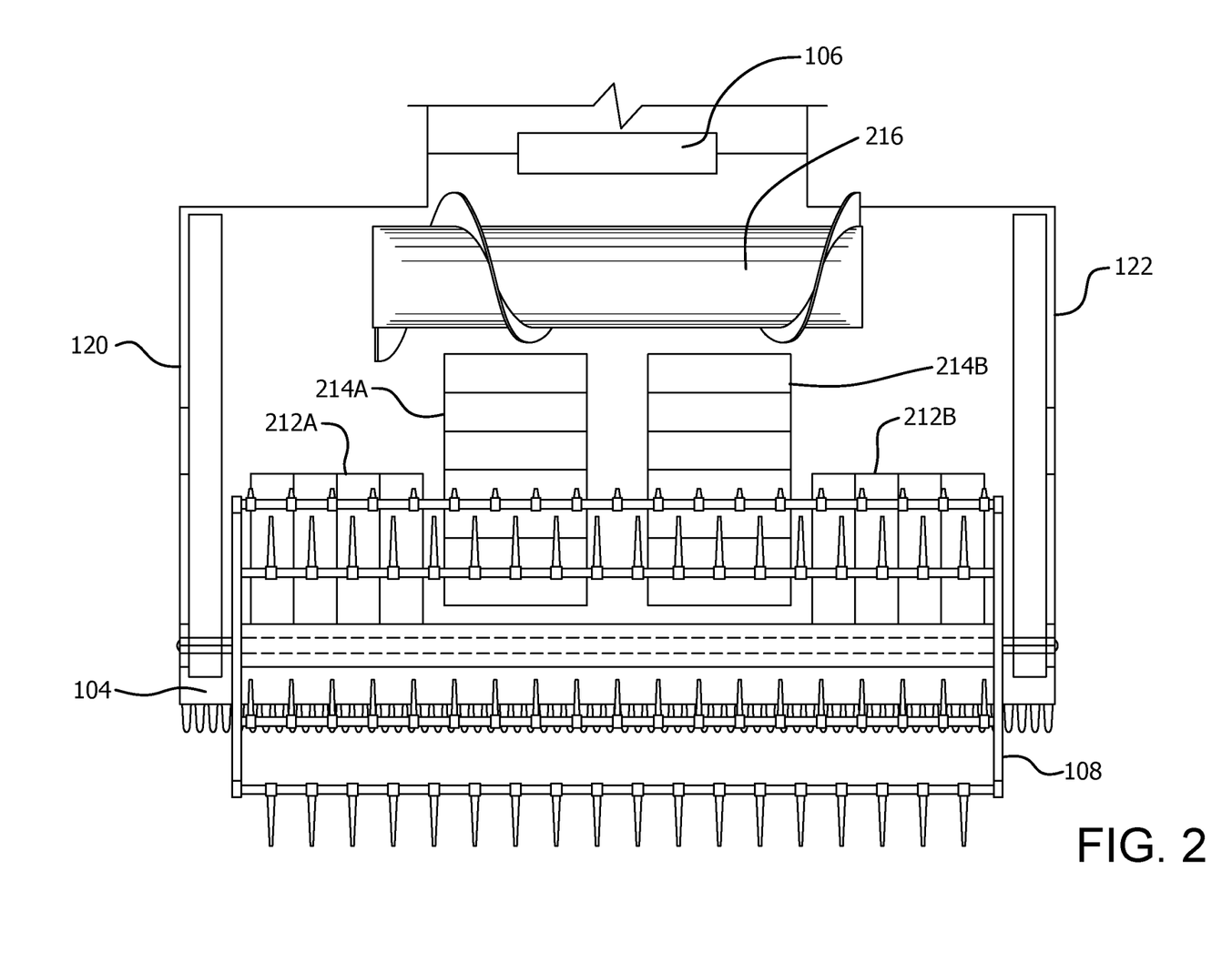
FIG. 2 is a top plan view of the header of FIG. 1.

The header 102 includes a longitudinally extending chassis 103 having a floor 104 that is supported in desired proximity to the surface of a crop field. First and second cutting assemblies 105A, 105B extend along a forward edge of the floor 104 i.e., in a transverse or longitudinal direction of the header, and are generally bounded by a first side edge 120 and an opposing second side edge 122. The first and second cutting assemblies 105A, 105B are configured to cut crops in preparation for induction into the feederhouse 106. As shown in FIGS. 1 and 2, the header 102 can further include an elongate, rotatable reel 108 that extends in close proximity to the first and second cutting assemblies 105A, 105B. Reel 108 is operable to deliver cut crop from the cutting assemblies 105A, 105B to a plurality of conveyors, namely a pair of opposed, transversely extending draper belt conveyors 212A, 212B that deliver cut cop to one or more fore and aft extending feed conveyors 214A, 214B, as depicted in FIG. 2. Optionally, the header 102 may additionally include an auger conveyor 216 for delivering cut crop from the feeder conveyor(s) 214A, 214B to the feederhouse 106 which is configured to convey the cut crops into the harvester 100 for threshing and cleaning as the harvester moves forward over a crop field. Alternatively, the header 102 may be equipped with one or more auger conveyors in lieu of draper conveyors and feed conveyors. While the foregoing aspects of the harvester are being described with respect to the header shown, the cutting assembly of the subject application can be applied to any other header having use for such a cutting assembly.

According to an exemplary embodiment as shown in FIG. 1, the cutting assemblies 105A, 105B include a first cutter bar 142 and a second cutter bar 142'. The cutting assemblies 105A, 105B are driven in oscillating motion by a knife head drive assembly, unillustrated in FIG. 2 but described below in connection with FIGS. 3-7, whereby the knife heads move laterally to the left and right. Additional exemplary cutter knife heads applicable to the present exemplary embodiments are disclosed e.g., in U.S. Pat. Nos. 7,730,709 and 8,151,547, the entire disclosures of which are incorporated by reference herein in their entirety for all purposes.

Figure 3:
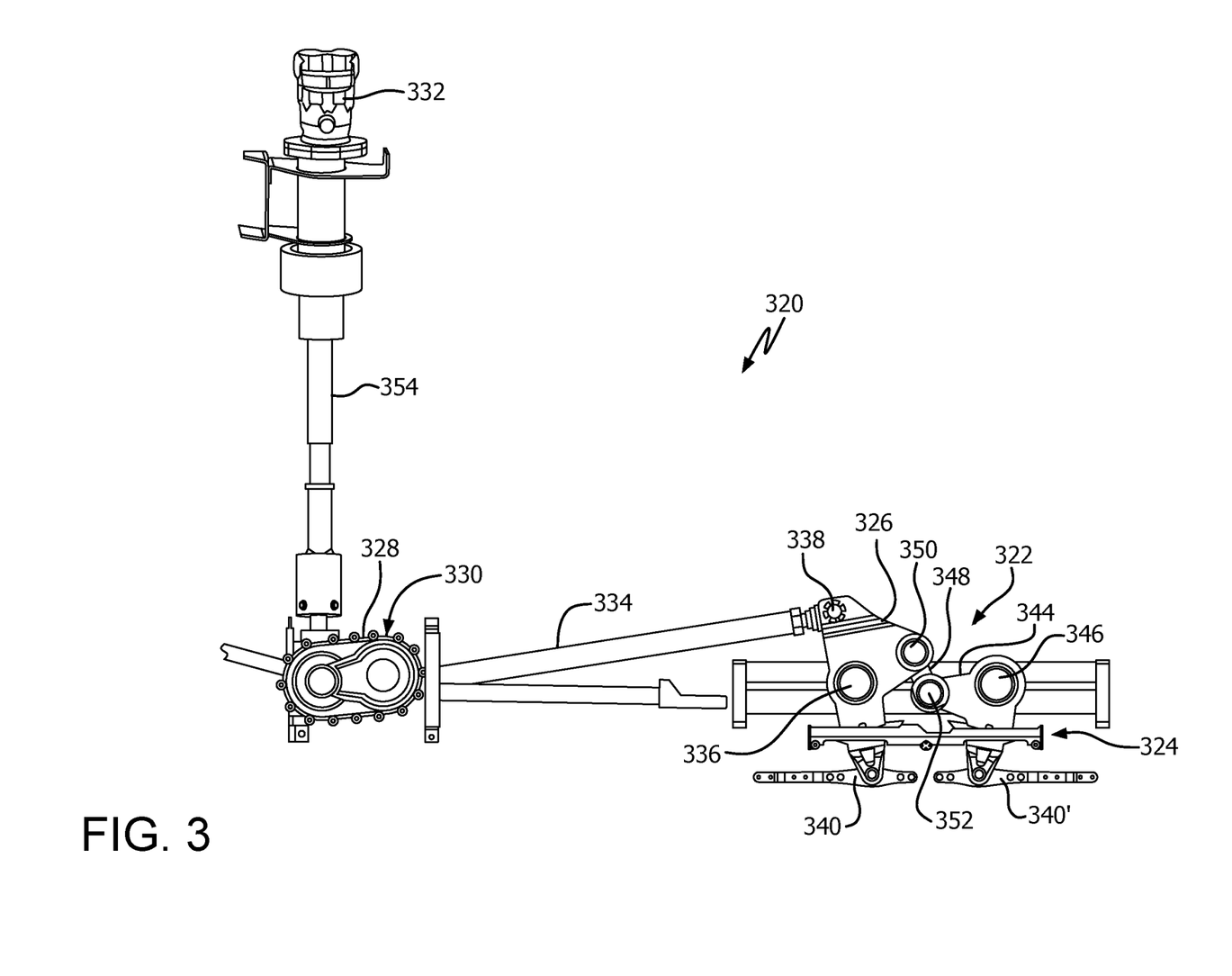
FIG. 3 is a top plan view of view of a knife head drive assembly in accordance with an exemplary embodiment of the subject disclosure for use in the header of FIG. 2.

Referring to FIG. 3, the knife head drive assembly according to a first exemplary embodiment is identified by reference numeral 320 and converts rotational motion to oscillating motion. The knife head drive assembly 320 comprises a knife head assembly 322 for attachment to a forward end 324 of the header. A first pivot arm or, simply, pivot arm 326 is carried by the knife head assembly 322. A rotating crank 328 of an oscillating drive mechanism or gearbox 330 is operatively connected to the pivot arm 326 and engaged with a drive 332.

Figure 6:
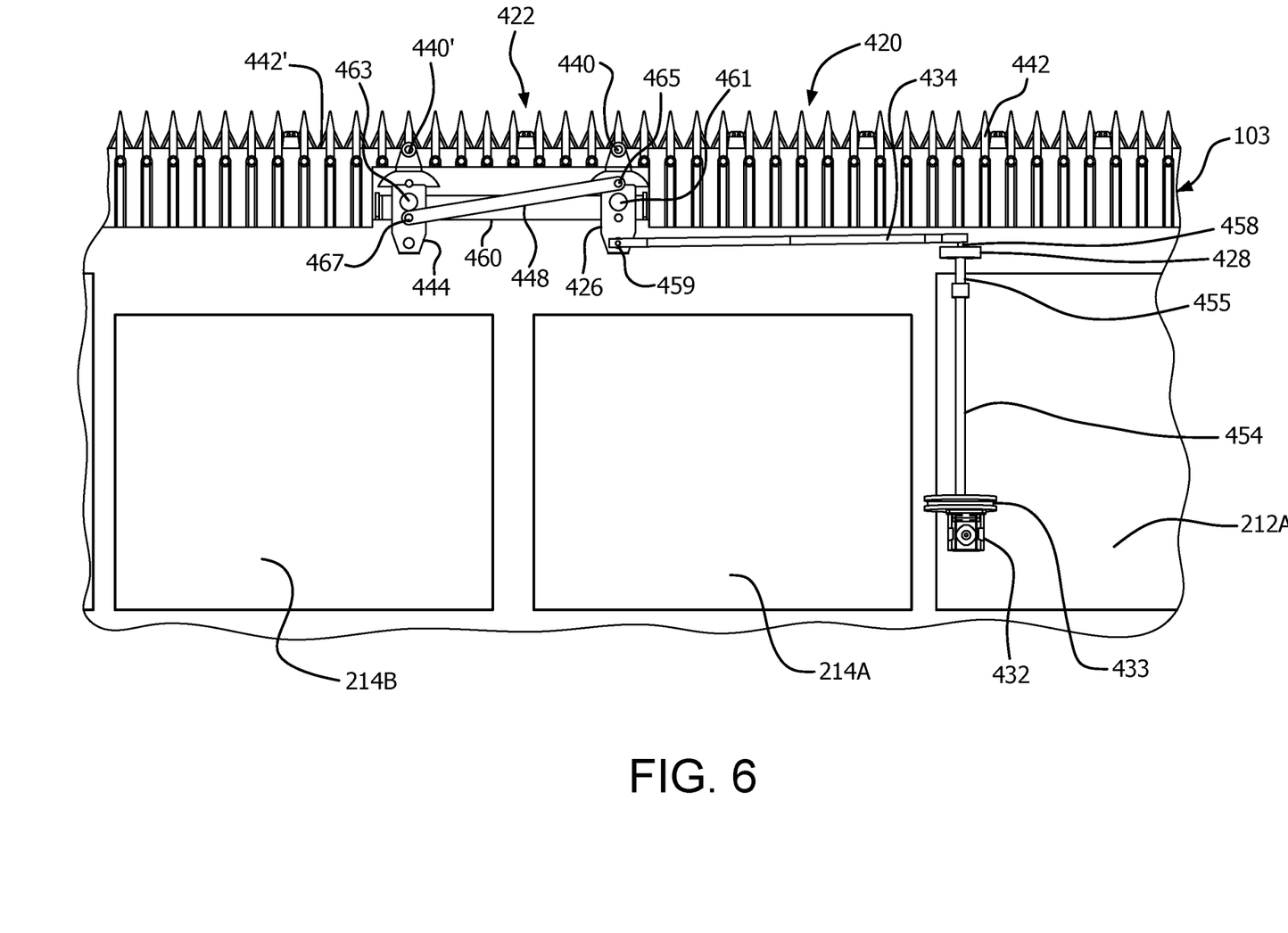
FIG. 6 is a bottom view of a header incorporating the knife head drive assembly of FIG. 4.
Figure 8:
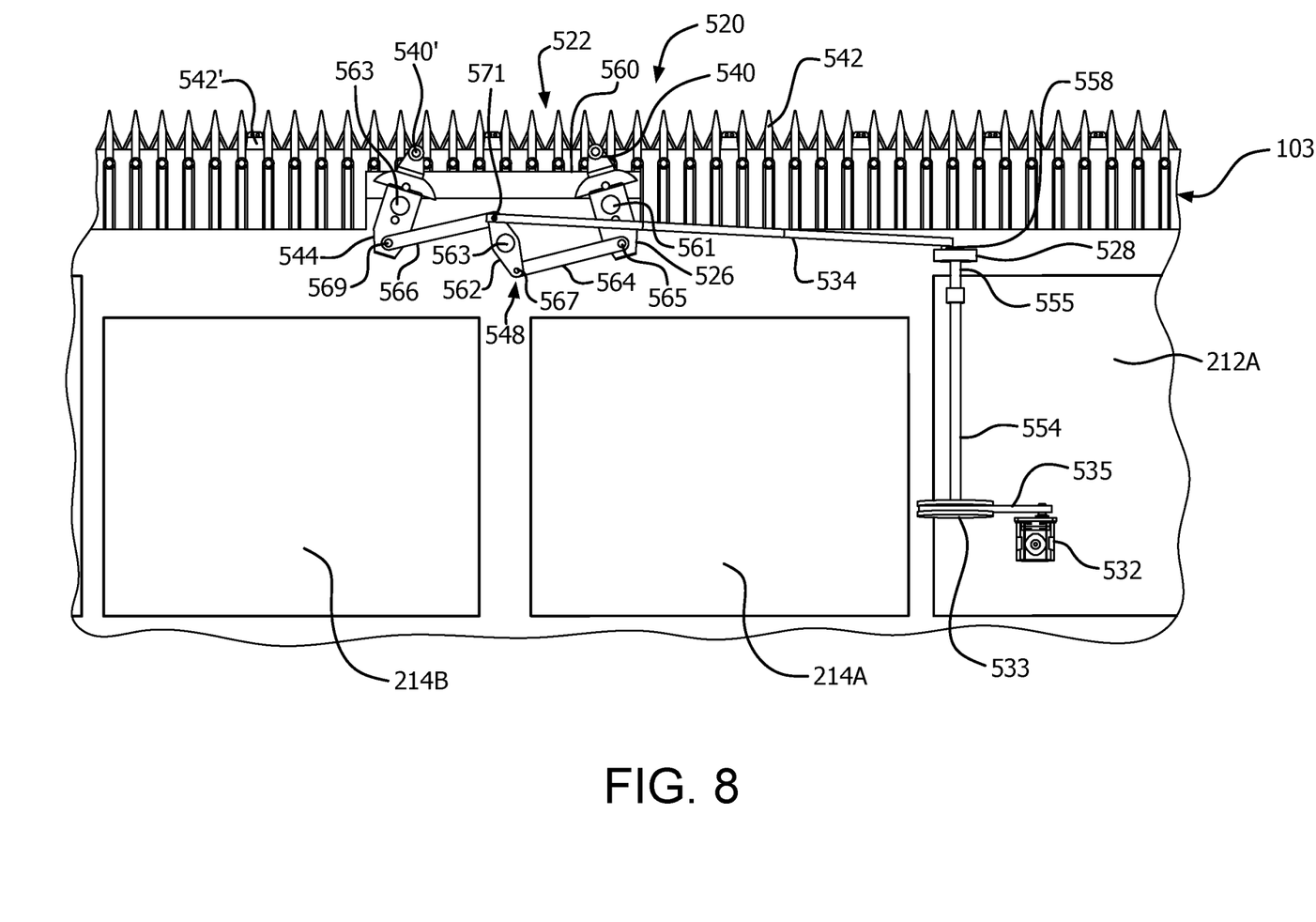
FIG. 8 is a bottom view of a header incorporating the knife head drive assembly of FIG. 5.

The drive 332 may be a hydraulic or electric motor or a shaft driven by the power takeoff (PTO) of the harvester 100. As seen in FIGS. 6 and 8, the drive, e.g., drive 632, is located adjacent a lateral side of one of the feed conveyor(s) 214A and the rotating crank is operatively connected to the drive. The drive, as well as the later described drive shaft, oscillating mechanism, and reciprocating shaft are disposed beneath the draper belt and go around the feed conveyor 214A (e.g., around the lateral side of the feed conveyor) rather than beneath it.

Again referring to FIG. 3, the knife head assembly, e.g., knife head assembly 322, discussed below, is disposed about a forward end of the conveyor(s) 214A, 214B and spaced from the drive 332. A reciprocating shaft 334, discussed below, is connected to the rotating crank 328 and the knife head assembly 322. Alternatively, the later described drive shaft 354 may be disposed inside, i.e., between upper and lower runs, of the lateral draper conveyor belt 212A. The pivot arm 326 is pivotably connected to the forward end 324 of the header at pivot 336. A first end of the pivot arm 326 is pivotably connected 338 to a first end of reciprocating shaft 334 while a second end of pivot arm 326 is connected to a knife head 340 which in turn is connected to cutter bar 142 (FIG. 1). More particularly, the reciprocating shaft 334 has a first end connected to a first end of the first pivot arm 326 and a second end connected to the rotating crank 328.

The knife head assembly 322 further comprises a second pivot arm 344 which is pivotably connected to the forward end 324 of the header at pivot 346. The second pivot arm 344 is connected to a knife head 340' which in turn is connected to the cutter bar 142' (FIG. 1).

A linkage 348 pivotably connects pivot arm 326 and second pivot arm 344. As seen in FIG. 3, the linkage 348 is constructed as a single link pivotably connected to the pivot arm 326 at pivot 350 and pivotably connected to the second pivot arm 344 at pivot 352. The linkage 348 operates in such a way that pivoting of the pivot arm by the reciprocating shaft in a first direction causes the linkage to pivot the second pivot arm in a second direction opposite the first direction, and pivoting of the pivot arm by the reciprocating shaft in the second direction causes the linkage to pivot the second pivot arm in the first direction.

As also shown in FIG. 3, a drive shaft 354 connects the drive 332 and an oscillating drive mechanism or gearbox 330 for driving the rotating crank 328. The drive shaft 354 is arranged generally transverse to the reciprocating shaft 334.

Figure 9:
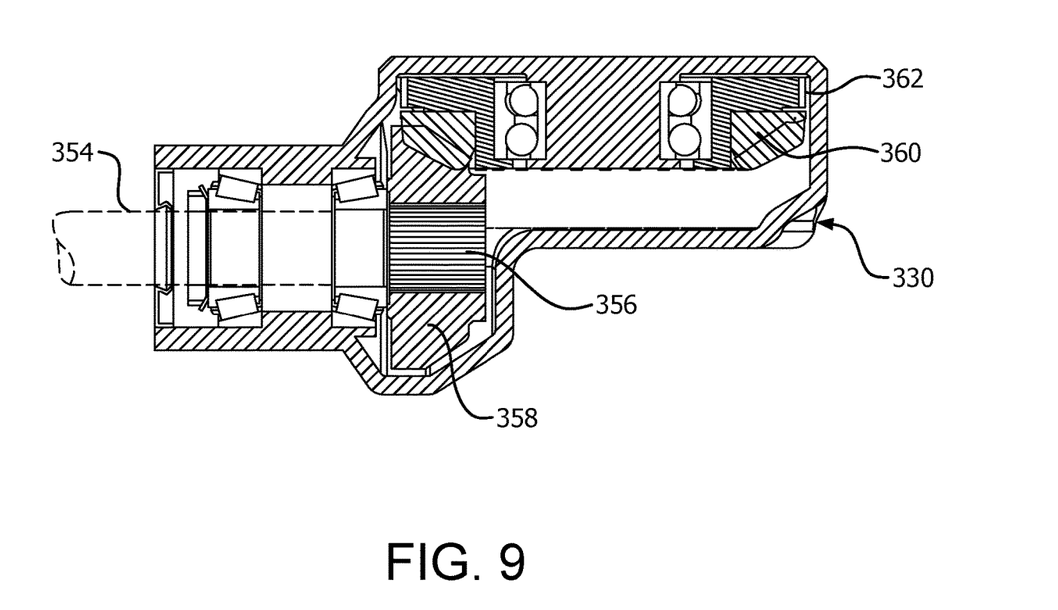
FIG. 9 is a cross-sectional view of a portion of a gearbox of a knife head drive assembly constructed in accordance with FIG. 3.
Figure 10:
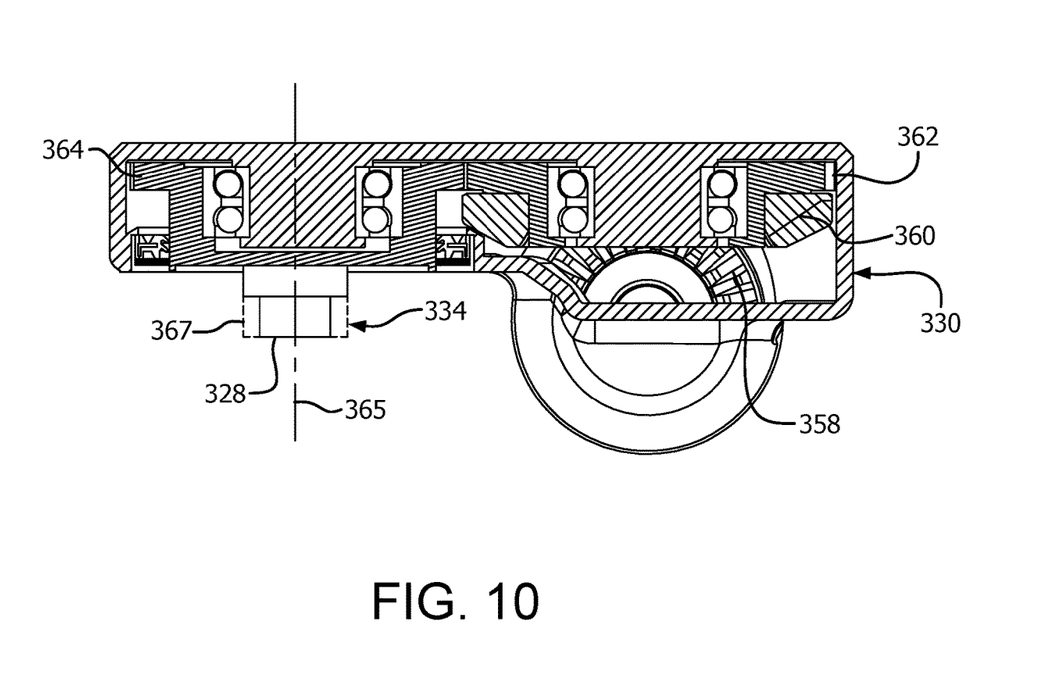
FIG. 10 is another cross-sectional view of a portion of a gearbox of a knife head drive assembly constructed in accordance with FIG. 3.

Referring to FIGS. 9 and 10, the drive shaft 354 (shown in dashed line in FIG. 9) drivingly engages via a splined connection 356 a first bevel gear 358 in the oscillating drive mechanism or gearbox 330. The first bevel gear 358, in turn, meshes with and turns a second bevel gear 360. Affixed to the second bevel gear 360 is a first spur gear 362 whereby rotation of the second bevel gear causes similar rotation of the first spur gear. The first spur gear 362, in turn, meshes with and turns a second spur gear 364 which fixedly carries a rotating crank 328 that is eccentrically mounted with respect to a central axis 365 of the second spur gear 364 and is connected, such as by a journaled connection 367 to the second end of the reciprocating shaft 334, shown in FIG. 10.

In operation, the drive 332 rotates the drive shaft 354 which turns the first and second bevel gears 358, 360 in the gearbox 330. Rotation of the second bevel gear results in rotation of the first and second spur gears 362, 364 and the eccentrically mounted rotating crank 328. The orbital path traversed by the rotating crank 328 causes the reciprocating shaft 334 to oscillate back and forth toward and away from the knife head assembly 322. In so doing, as seen in FIG. 3, pivoting of the first pivot arm 326 by the reciprocating shaft 334 in a first direction causes the linkage 348 to pivot the second pivot arm 344 in a second direction opposite the first direction. Further, pivoting of the first pivot arm 326 by the reciprocating shaft 334 in the second direction causes the linkage 348 to pivot the second pivot arm 344 in the first direction. Consequently, as the reciprocating shaft 334 moves in a first direction of its stroke, i.e., towards the knife head assembly 322, the first pivot arm 326 pivots in a first (clockwise as shown in FIG. 3) direction. As a result, the knife head 340 and the cutterbar 142 (FIG. 1) carried thereby move in a transverse direction to the left in FIG. 3. Concurrently, the second pivot arm 344 pivots in a second (counterclockwise as shown in FIG. 3) direction, thereby resulting in the knife head 340' and the cutterbar 142' (FIG. 1) carried thereby moving in a transverse direction to the right in FIG. 3. Conversely, as the reciprocating shaft 334 moves in a second direction of its stroke, i.e., away from the knife head assembly 322, the first pivot arm 326 pivots in a second (counterclockwise) direction. As a result, the knife head 340 and the cutterbar 142 carried thereby move in a transverse direction to the right in FIG. 3. Concurrently, as the second pivot arm 344 pivots in a first (clockwise) direction, the knife head 340' and the cutterbar 142' carried thereby move in a transverse direction to the left in FIG. 3. In sum, movement of the reciprocating shaft 334 towards the knife head assembly 322 causes the cutterbars 142, 142' to move away from each other and movement of the reciprocating shaft 334 away from the knife head assembly 322 causes the cutterbars 142, 142' to move towards each other.

Figure 4:
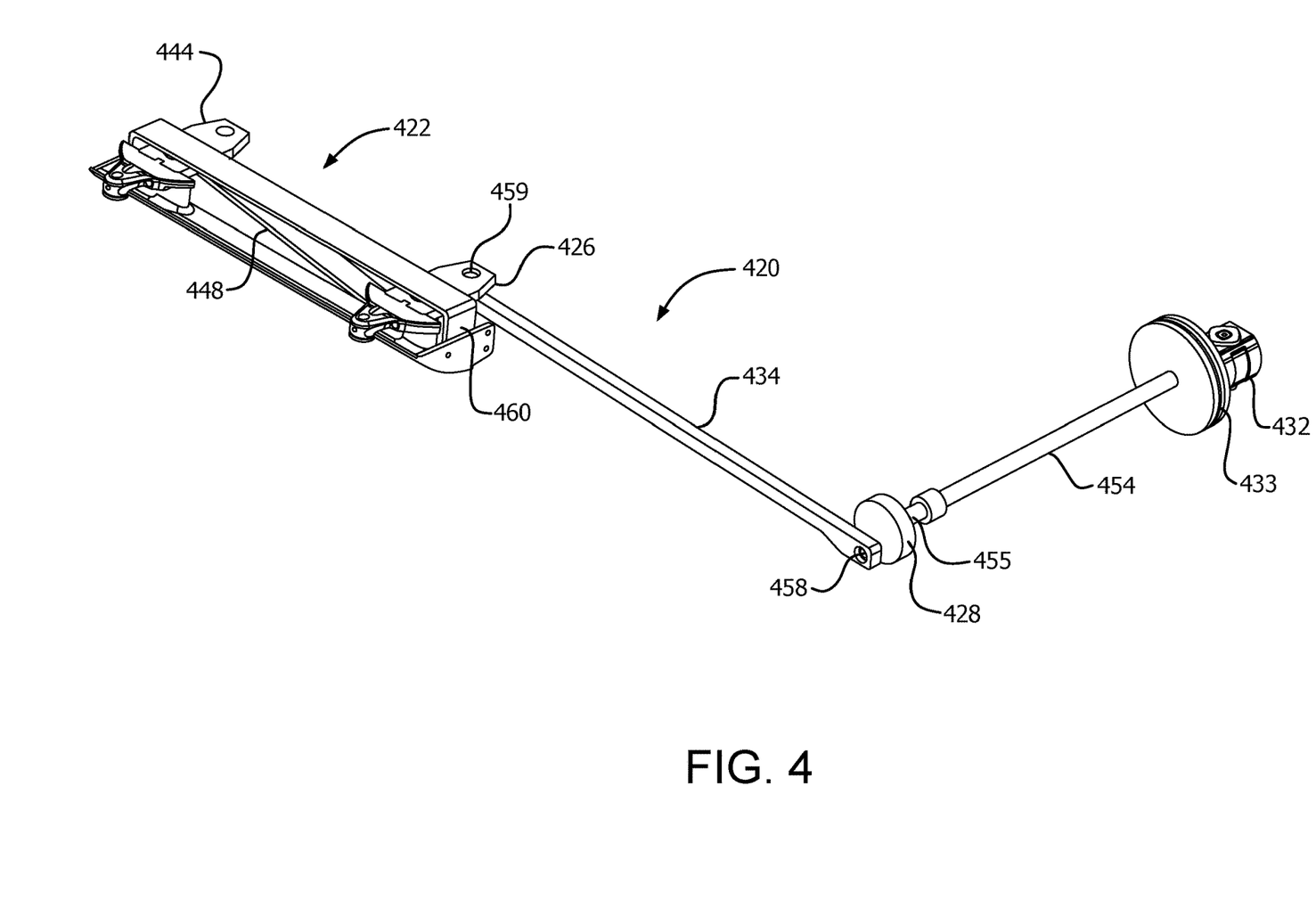
FIG. 4 is a top perspective view of a knife head drive assembly in accordance with another exemplary embodiment of the subject disclosure for use in the header of FIG. 2.

Referring to FIGS. 4 and 6, a knife head drive assembly according to another exemplary embodiment of the subject disclosure is identified by reference numeral 420 and likewise converts rotational motion to oscillating motion. According to this exemplary embodiment, a drive 432 rotates a flywheel 433 that is connected to a first end of a drive shaft 454. The second end of the drive shaft 454 is connected to a rearwardly extending shaft 455 of an oscillating drive mechanism in the form of a rotating crank 428 having a forwardly extending pin 458 eccentrically arranged with respect to a central rotational axis of the rotating crank 428. A first end of a transversely or substantially longitudinally extending reciprocating shaft 434 is connected to a knife head assembly 422. In particular, the first end of the reciprocating shaft 434 is connected to the knife head assembly 422 and a second end of the reciprocating shaft 434 is connected to, e.g., journaled about pin 458, the rotating crank. A second pivot arm 444 is carried by the knife head assembly 422 and a linkage 448 is pivotably connected to the pivot arm 426 and the second pivot arm 444. More specifically, the linkage 448 is a link having a first end pivotably connected to the first pivot arm and a second end pivotably connected to the second pivot arm as further described below.

According to this exemplary embodiment, a bracket 460 is secured to the chassis 103 (FIG. 6), and the first and second pivot arms 426, 444 are pivotably connected to the bracket. As seen in FIG. 6, the first pivot arm 426 has a first end, an intermediate portion and a second end, and the first end of the reciprocating shaft 434 is pivotably connected to the first end of the first pivot arm at pivot (or pivot joint) 459. The intermediate portion of the first pivot arm is pivotably connected at pivot (or pivot joint) 461 to the bracket 460, and the second end of the first pivot arm 426 is connected to a first cutterbar knife head 440. The second pivot arm 444 has a first end, an intermediate portion and a second end, and the intermediate portion of the second pivot arm is pivotably connected to the bracket 360 at pivot (or pivot joint) 463, and the second end of the second pivot arm is connected to a second cutterbar knife head 440'. A first end of the linkage 448 is pivotably connected to the first pivot arm at pivot (or pivot joint) 465 between the intermediate portion and the second end of the first pivot arm. A second end of the linkage 448 is pivotably connected to the second pivot arm at pivot (or pivot joint) 467 between the intermediate portion and the first end of the second pivot arm.

In operation, the drive 432 rotates the drive shaft 454 which turns the rotating crank 428. The eccentrically arranged pin 458 carried by the rotating crank 428 orbits about the central rotational axis of the rotating crank and carries with it the second end of the reciprocating shaft 434, thereby causing the reciprocating shaft to move in an oscillating or back-and-forth motion. Accordingly, the first end of the reciprocating shaft 434 pushes and pulls on the first end of the first pivot arm 426. When the stroke of the reciprocating shaft 434 pushes on the first pivot arm 426 the first pivot arm pivots in a clockwise direction (with reference to FIG. 6) thereby causing the knife head 440 and cutter bar 442 to move to the right. Simultaneously, the clockwise pivoting of the first pivot arm 426 urges a first end of the linkage 448 to the right while the second end of the linkage urges the second pivot arm 444 to pivot in a counterclockwise direction (with reference to FIG. 6) thereby causing the knife head 440' and cutter bar 442' to move to the left whereby the cutterbars 442 and 442' move away from each other. Thus, when the stroke of the reciprocating shaft 434 pulls on the first pivot arm 426, the converse of the foregoing motions occurs and the cutterbars 442 and 442' move towards each other.

While FIGS. 4 and 6 show the bracket 460 secured to the chassis 103, the subject disclosure is not so limited. That is, in certain headers the cutterbars are flexible. In such case, the knife head drive assembly may be connected to the flexible cutterbar assembly which, in turn, is secured to the chassis. In addition, it is understood that the reciprocating shafts shown in FIGS. 3, 4 and 6 may be connected to the second pivot arms or the respective linkages instead of the first pivot arms and the same counter oscillating motion of the cutterbars will be achieved.

Figure 7:
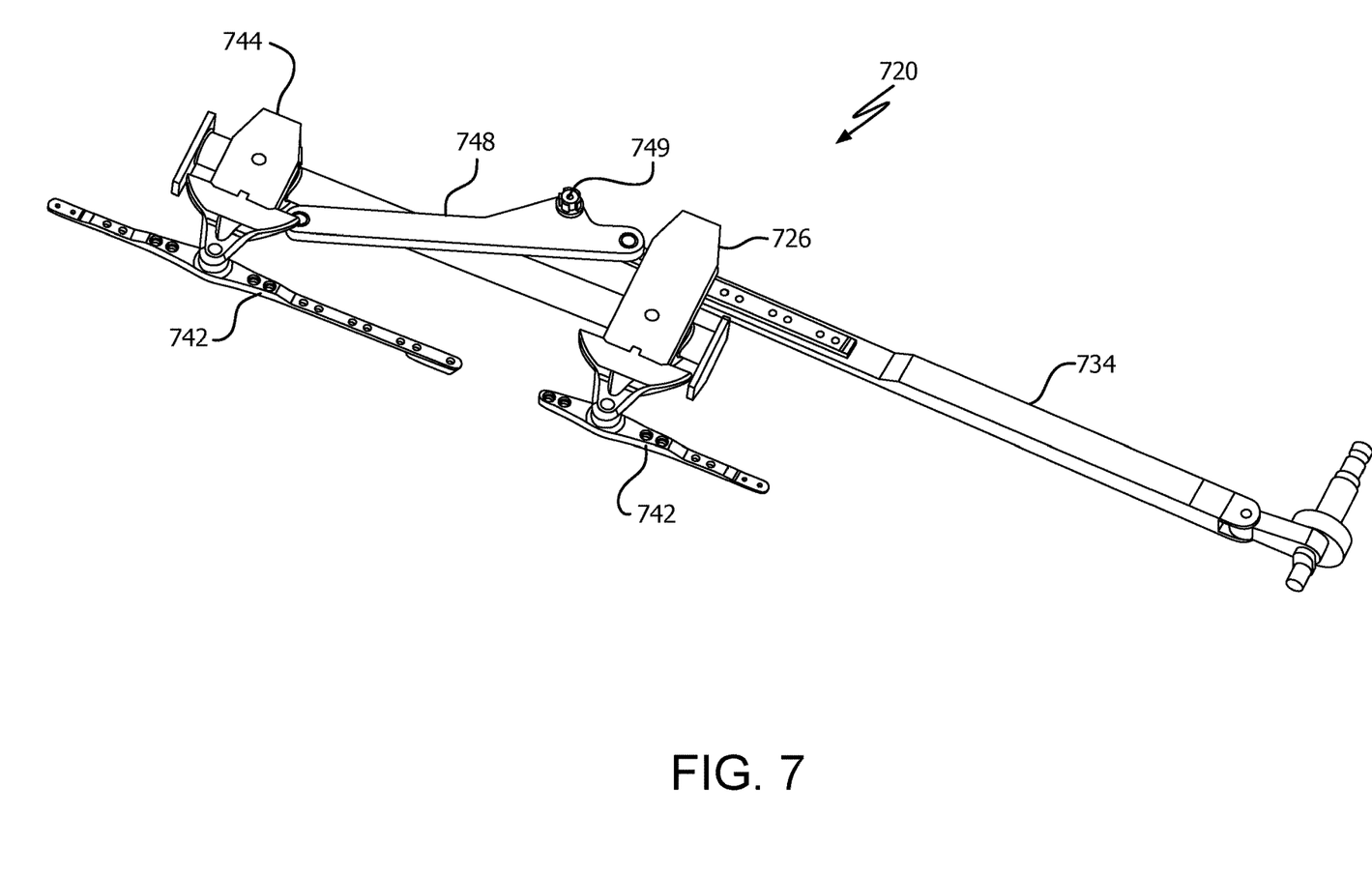
FIG. 7 is a top perspective view of a knife head drive assembly in accordance with another exemplary embodiment of the subject disclosure for use in the header of FIG. 2.

For example, FIG. 7 shows a knife head drive assembly 720 wherein the first end of a reciprocating shaft 734 is pivotably connected to a linkage 748 at pivot (or pivot joint) 749, wherein the linkage has a first end pivotably connected to a first pivot arm 726 and a second end pivotably connected to a second pivot arm 744.

Figure 5:
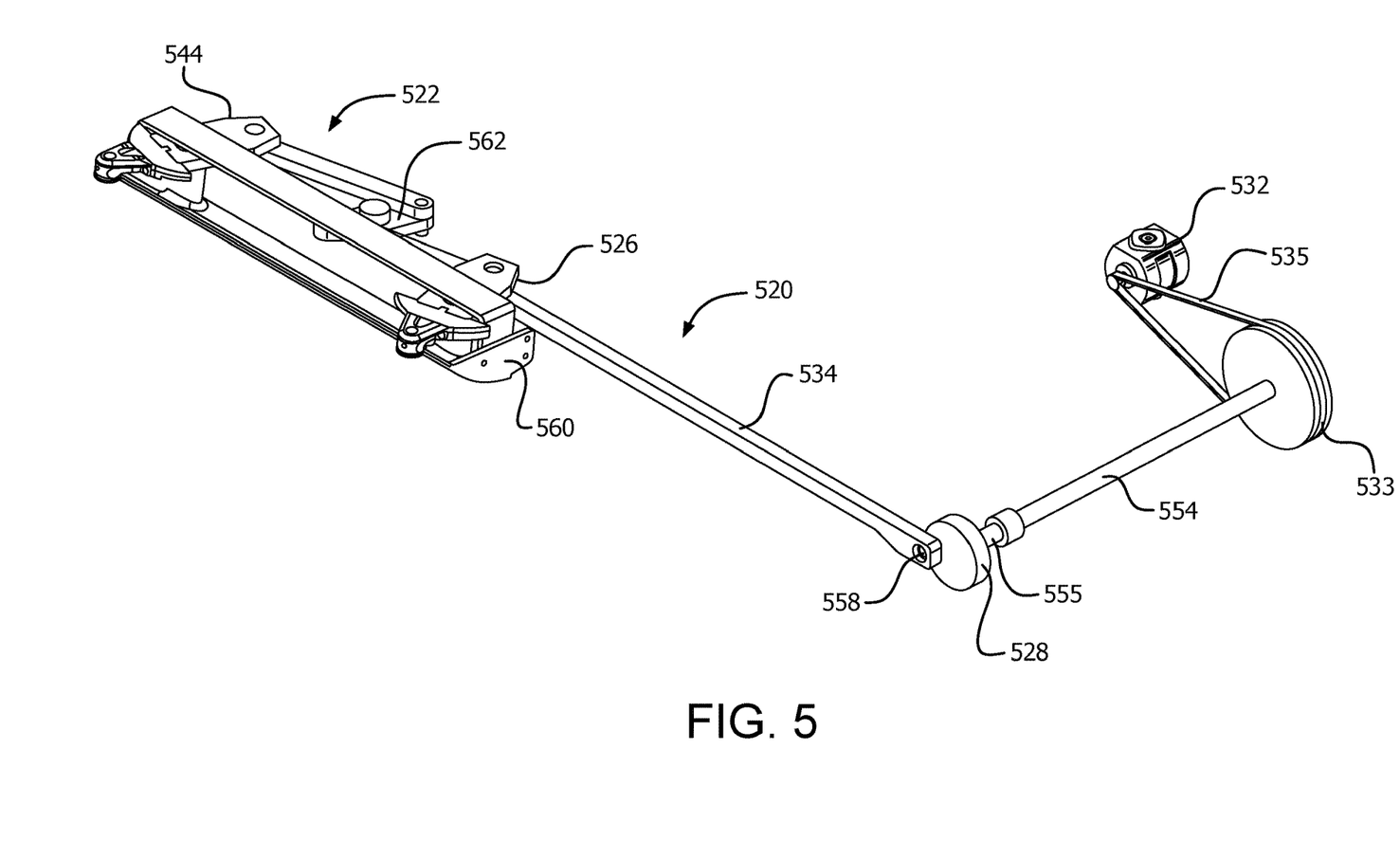
FIG. 5 is a top perspective view of a knife head drive assembly in accordance with another exemplary embodiment of the subject disclosure for use in the header of FIG. 2.

Referring to FIGS. 5 and 8, a knife head drive assembly according to a another exemplary embodiment of the subject disclosure is identified by reference numeral 520 and likewise converts rotational motion to oscillating motion. According to this exemplary embodiment, a drive 532 rotates a flywheel 533 via a belt, chain or similar endless member 535 that is connected to a first end of a drive shaft 554. The second end of the drive shaft 554 is connected to a rearwardly extending shaft 555 of an oscillating drive mechanism in the form of a rotating crank 528 having a forwardly extending pin 558 eccentrically arranged with respect to the central rotational axis of the rotating crank. A first end of a transversely or substantially longitudinally extending reciprocating shaft 534 is connected to a knife head assembly 522. In particular, the first end of reciprocating shaft 534 is connected to the knife head assembly 522 and a second end of the reciprocating shaft 534 is connected to, e.g., journaled about the pin 558, the rotating crank. A second pivot arm 544 is carried by the knife head assembly 522 and a linkage 548 is pivotably connected to the pivot arm 526 and the second pivot arm 544. More specifically, the linkage 548 comprises a plurality of links pivotably connected to the first pivot arm and the second pivot arm.

Referring to FIG. 8, a bracket 560 is secured to the chassis 103, and the first and second pivot arms 526, 544 are pivotably connected to the bracket. The first pivot arm 526 has a first end, an intermediate portion and a second end, and the second pivot arm 544 has a first end, an intermediate portion and a second end. The intermediate portions of the first and second pivot arms are pivotably connected to bracket 560 at pivots 561 and 563, respectively, and the second ends of the first and second pivot arms are respectively connected to first and second cutterbar knife heads 540, 540'.

The linkage 548 comprises a central link 562 having a first end, an intermediate portion pivotably connected to the chassis at pivot 563, and a second end. The linkage 548 further comprises a first lateral link 564 having a first end pivotably connected to the first end of the first pivot arm 526 at pivot 565 and a second end pivotably connected to the first end of the central link 562 at pivot 567. Additionally, the linkage 548 comprises a second lateral link 566 having a first end pivotably connected to the first end of the second pivot arm 544 at pivot 569 and a second end pivotably connected to the second end of the central link 562 at pivot (or pivot joint) 571. Furthermore, the reciprocating shaft 534 is arranged generally in the longitudinal direction of the chassis and has a first end connected to the central link 562 at pivot 571 and a second end connected to the oscillating drive mechanism at pin 558. So constructed and arranged, the reciprocating shaft 534 is configured to pivot the central link 562 in a first direction and a second direction opposite the first direction.

In operation, the drive 532, via the belt 535 and the flywheel 533, rotates drive shaft 554 which turns the rotating crank 528. The eccentrically arranged pin 558 carried by the rotating crank 528 orbits about the central rotational axis of the rotating crank and carries with it the second end of the reciprocating shaft 534, thereby causing the reciprocating shaft to move in an oscillating or back-and-forth motion. Accordingly, the first end of the reciprocating shaft 534 pushes and pulls on the second end of the central link 562 causing it to pivot back and forth about pivot 563. When the stroke of the reciprocating shaft 534 pushes on the central link 562 the central link pivots in a counterclockwise direction (with reference to FIG. 8) thereby causing the first lateral link 564 to push against the first pivot arm 526 at pivot 565. In so doing, the first pivot arm 526 likewise pivots about pivot 561 in a counterclockwise direction whereby the knife head 540 and cutter bar 542 move to the left.

Simultaneously, the counterclockwise pivoting of the central link 562 causes the second lateral link 566 to push against the second pivot arm 544 at pivot 569. In so doing, the second pivot arm 526 pivots about pivot 563 in a clockwise direction whereby the knife head 540' and cutter bar 542' move to the right, and the cutterbars 542 and 542' move towards each other. It will be understood that when the stroke of the reciprocating shaft 534 pulls on the central link 562, the converse of the foregoing motions occurs and the cutterbars 542 and 542' move away from each other.

Figures 11, 12:
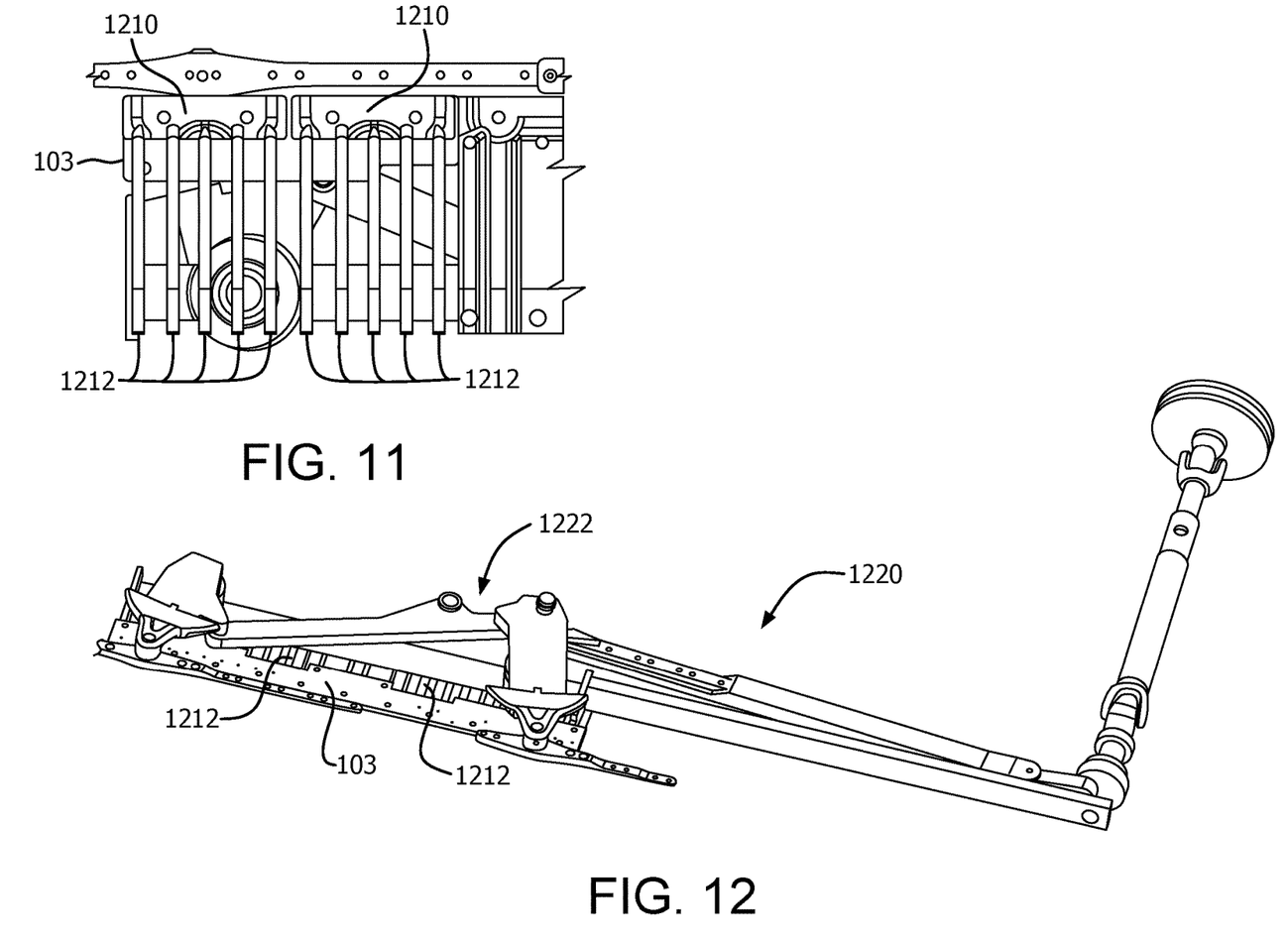
FIG. 11 is a bottom view of skid shoes comprising a plurality of spaced apart fingers applicable to the header of FIG. 2.
FIG. 12 is a top perspective view of a knife head drive assembly in accordance with another exemplary embodiment of the subject disclosure overlying the skid shoes of FIG. 11.

Referring to FIGS. 11 and 12, there is shown a plurality of open grate skid shoes 1210 that underlie a knife head assembly 1222 of a knife head drive assembly 1220. Knife head drive assembly 1220 is constructed and functions substantially similarly to knife head drive assembly 320 described above. As seen in FIGS. 11 and 12, skid shoes 1210 are connected to or otherwise fastened to the header chassis and are comprised of a plurality of spaced apart fingers 1212. During operation of the knife head drive assembly 1220, dirt and debris that would otherwise interfere with the movement of the various parts of the knife head assembly 1222 falls through the gaps formed between the fingers 1212 while the gaps also allow crop stubble on the field to wipe clean areas at the center of the knife head assembly adjacent the skid shoes. In other words, the skid shoe 1210 is constructed as an open grate for permitting debris to pass from the knife head drive assembly 1220 during operation of the agricultural harvester. It is noted that none of the components of the knife head drive assembly 1220 or any of the knife head drive assemblies described hereinabove are enclosed in a housing or completely shielded. That is, the several components of the knife head drive assemblies are exposed to the environment. As used herein, the terms "exposed" and "unhoused" mean that the applicable components are not enclosed within a housing or completely shielded.

Figure 13:
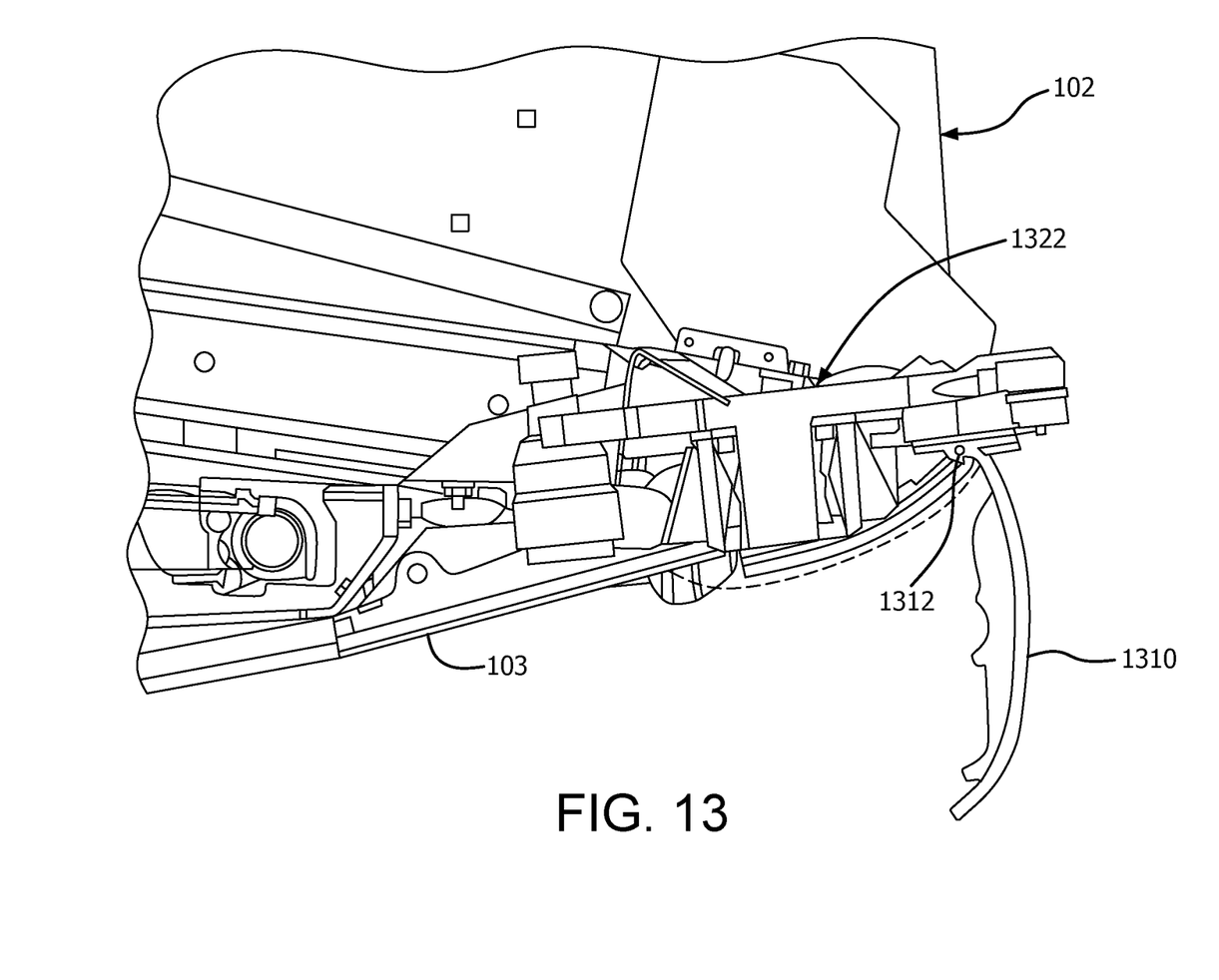
FIG. 13 is a side elevation view of a header including a knife head drive assembly in accordance with the subject disclosure showing a hinged skid shoe located beneath the knife head drive assembly.

Referring to FIG. 13, there is shown a forward end of the header 102 including a knife head assembly identified generally by reference numeral 1322 which may assume any of the forms of knife head assemblies described hereinabove. Also shown is a skid shoe 1310 in accordance with a further exemplary embodiment of the subject disclosure. Similar to skid shoe 1210, skid shoe 1310 is constructed and arranged to underlie and protect the knife head assembly 1322 during operation of the agricultural harvester. The skid shoe 1310 is depicted in a pendant position whereby it is connected at its forward end to the header chassis 103 by a pivot (or pivot joint) 1312. The skid shoe 1310 thus has a forward end and a rearward end, and positioned beneath the knife head assembly, wherein the forward end of the skid shoe is pivotably connected to the chassis. The skid shoe 1310 assumes the illustrated pendant position whenever it is desired or necessary to remove dirt and debris that may have collected beneath the knife head assembly 1322. Once the skid shoe 1310 is swung down into the pendant position shown in FIG. 13, dirt and debris may fall from the knife head assembly 1322 and any remaining dirt and debris may be removed by a suitable cleaning tool such as a brush or the like. Additionally, the skid shoe may be pivoted rearwardly about pivot 1312 to a retracted position (shown in dashed phantom line) and latched by a suitable fastener such as an unillustrated removable pin or the like that passes through a rearward end of the skid shoe and into the chassis 103 of the header 102. In other words, the skid shoe 1310 is connected to the chassis and movable between a latched and unlatched position, wherein in the unlatched position the skid shoe depends from the chassis to permit cleaning of the knife head assembly 1322 and in a latched position the skid shoe covers the knife head assembly. Accordingly, the pivotably mounted skid shoe 1310 represents an effective device for protecting the knife head assembly 1322 during operation of the agricultural harvester yet it is a convenient and easy to use mechanism by which to clean and maintain the knife head assembly 1322 when necessary.

The design of the exemplary embodiments of the subject disclosure is an open design such that any component of the system is simple and easy to replace versus a rebuild of currently deployed sealed knife drive gearboxes. That is, if a component does fail it is simpler and less expensive to repair due to the open nature of the design (e.g., a single component can be replaced).

Furthermore, by virtue of the reciprocating shaft extending transversely (longitudinally) the knife head assembly can be in the center of the header while the power to it is transferred around the center feed conveyor and feeder section toward the back of the header where there is more room and less debris. In addition, the compact construction of the knife head assemblies of the exemplary embodiments enables the infeed conveyor of the header to be moved further forward than the infeed conveyors of conventional headers.

The knife head assemblies according to the subject disclosure are designed in such a way that they can be a direct replacement for existing knife drives at the time of manufacture. In addition, the rest of the drive (e.g., drive, drive shaft and reciprocating shaft) are retrofitable to existing headers to replace the current gearbox system that is not reliable in debris conditions.

Moreover, the knife head drive assemblies can be installed on other grain headers like a flex auger head and a rigid auger head. The mechanical drive disclosed herein would be advantageous on such heads since they do not require hydraulic drives.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A header for an agricultural harvester comprising:
   a chassis;
   a conveyor supported by the chassis;
   a drive supported by the chassis;
   a rotating crank operatively connected to the drive;
   a reciprocating shaft connected to the rotating crank; and
   a knife head assembly about a forward end of the conveyor, spaced from the drive, and connected to the reciprocating shaft, the knife head assembly comprising:
      a knife head, and
      a first pivot arm pivotably connected to the knife head and the reciprocating shaft, and wherein the first pivot arm comprises a pivot about which the first pivot arm pivots.

2. The header of claim 1, wherein the drive is positioned adjacent a lateral side of the conveyor.

3. The header of claim 1, wherein the knife head assembly further comprises a second pivot arm connected to the first pivot arm, and wherein pivoting of the first pivot arm by the reciprocating shaft in a first direction pivots the second pivot arm in a second direction opposite the first direction, and pivoting of the first pivot arm by the reciprocating shaft in the second direction causes the second pivot arm to pivot in the first direction.

4. The header of claim 1, further comprising a drive shaft driven by the drive and connected to an oscillating drive mechanism that includes the rotating crank.

5. The header of claim 4, wherein the oscillating drive mechanism includes a gear set connecting the drive shaft to a gear operably connected to the rotating crank, wherein the rotating crank includes an eccentrically arranged pin operatively connected to a second end of the reciprocating shaft for driving the reciprocating shaft in an oscillating motion.

6. The header of claim 1, further comprising a bracket supported by the chassis, first and second pivot arms pivotably connected to the bracket, and a linkage having a first end pivotably connected to the first pivot arm and a second end pivotably connected to the second pivot arm.

7. The header of claim 6, wherein the first pivot arm has a first end, an intermediate portion pivotably connected to the bracket, and a second end connected to a first cutterbar knife head, wherein the second pivot arm has a first end, an intermediate portion pivotably connected to the bracket, and a second end connected to a second cutterbar knife head, and wherein a first end of the reciprocating shaft is pivotably connected to the first pivot arm, the second pivot arm or the linkage.

8. The header of claim 1, wherein the knife head assembly further comprises:
a second pivot arm; and
a linkage comprising:
a central link having a first end, an intermediate portion pivotably connected to the chassis, and a second end,
a first lateral link having a first end pivotably connected to a first end of the first pivot arm and a second end pivotably connected to the first end of the central link, and
a second lateral link having a first end pivotably connected to a first end of the second pivot arm and a second end pivotably connected to the second end of the central link, and
wherein the reciprocating shaft is connected to the central link.

9. The header of claim 1, further comprising a skid shoe having a forward end and a rearward end, and positioned beneath the knife head assembly, wherein the forward end of the skid shoe is pivotably connected to the chassis.

10. The header of claim 9, wherein the rearward end of the skid shoe is connected to the chassis and movable between a latched and unlatched position, wherein in the unlatched position the skid shoe depends from the chassis to permit cleaning of the knife head assembly and in a latched position the skid shoe covers the knife head assembly.

11. A knife head drive assembly for a header of an agricultural harvester comprising:
a knife head assembly for attachment to a forward end of the header;
a rotating crank operatively connected to and extending substantially transverse to the knife head assembly for engagement with a drive;
a reciprocating shaft having a first end and a second end opposite the first end connected to the rotating crank; and
a first pivot arm carried by the knife head assembly, wherein the first pivot arm is pivotably connected to the knife head assembly, is pivotably connected to the reciprocating shaft, and comprises a pivot about which the first pivot arm pivots.

12. The knife head drive assembly of claim 11, further comprising a second pivot arm carried by the knife head assembly and a linkage pivotably connecting the first pivot arm and the second pivot arm, wherein pivoting of the first pivot arm by the reciprocating shaft in a first direction causes the linkage to pivot the second pivot arm in a second direction opposite the first direction, and wherein pivoting of the first pivot arm by the reciprocating shaft in the second direction causes the linkage to pivot the second pivot arm in the first direction.

13. The knife head drive assembly of claim 12, wherein the first pivot arm has a first end pivotably connected to the first end of the reciprocating shaft, an intermediate portion pivotably connected to a bracket, and a second end connected to a first cutterbar knife head, wherein the second pivot arm has a first end, an intermediate portion pivotably connected to the bracket, and a second end connected to a second cutterbar knife head, wherein a first end of the linkage is pivotably connected to the first pivot arm between the intermediate portion and the second end of the first pivot arm, and a second end of the linkage is pivotably connected to the second pivot arm between the intermediate portion and the first end of the second pivot arm.

14. The knife head drive assembly of claim 11, further comprising:
a second pivot arm;
a linkage comprising:
a central link having a first end, an intermediate portion for pivotably connecting to a header, and a second end,
a first lateral link having a first end pivotably connected to a first end of the first pivot arm and a second end pivotably connected to the first end of the central link, and
a second lateral link having a first end pivotably connected to a first end of the second pivot arm and a second end pivotably connected to the second end of the central link; and
a reciprocating shaft connected to the rotating crank and the central link.

15. The knife head drive assembly of claim 11, wherein the knife head drive assembly is unhoused.

16. The knife head drive assembly of claim 11, further comprising an open grate skid shoe positioned beneath the knife head assembly.

17. The knife head drive assembly of claim 11, further comprising a skid shoe positioned beneath the knife head assembly for pivotably mounting to a header.

18. An agricultural harvester comprising:
a powered vehicle;
a header for attachment to the powered vehicle, the header comprising:
a chassis,
a conveyor supported by the chassis,
a drive supported by the chassis; and
a knife head drive assembly comprising:
a knife head assembly attached to a forward end of the header,
a rotating crank operatively connected to and extending substantially transverse to the knife head assembly for engagement with the drive,
a reciprocating shaft connected to the rotating crank, and
a first pivot arm pivotably connected to the reciprocating shaft and the knife head assembly, wherein the first pivot arm comprises a pivot about which the first pivot arm pivots.

19. The agricultural harvester of claim 18, wherein the drive is positioned adjacent a lateral side of the conveyor.

20. The agricultural harvester of claim 18, further comprising a second pivot arm carried by the knife head assembly and a linkage pivotably connecting the first pivot arm and the second pivot arm, wherein pivoting of the first pivot arm by the reciprocating shaft in a first direction causes the linkage to pivot the second pivot arm in a second direction opposite the first direction, and wherein pivoting of the first pivot arm by the reciprocating shaft in the second direction causes the linkage to pivot the second pivot arm in the first direction.

21. The agricultural harvester of claim 18, further comprising a drive shaft connecting the drive to the rotating crank, and wherein the drive shaft extends generally transverse to the reciprocating shaft.

* * * * *